(12) United States Patent
Vogt et al.

(10) Patent No.: US 7,198,852 B1
(45) Date of Patent: Apr. 3, 2007

(54) GRAFT COPOLYMER MIXTURE WITH IMPROVED PROPERTIES AND THE USE THEREOF AS AN ADHESION PROMOTER

(75) Inventors: Heinz Vogt, Ludwigshafen (DE); Klaus Drochner, Dudenhofen (DE)

(73) Assignee: Basell Polyolefine GmbH, Wesseling (DE)

( * ) Notice: Subject to any disclaimer, the term of this patent is extended or adjusted under 35 U.S.C. 154(b) by 767 days.

(21) Appl. No.: 10/312,856

(22) PCT Filed: Jun. 28, 2001

(86) PCT No.: PCT/EP01/07412

§ 371 (c)(1),
(2), (4) Date: Jan. 2, 2003

(87) PCT Pub. No.: WO02/02661

PCT Pub. Date: Jan. 10, 2002

(30) Foreign Application Priority Data

Jul. 3, 2000 (DE) ................................ 100 31 393

(51) Int. Cl.
*C08L 51/00* (2006.01)
*C08L 51/06* (2006.01)

(52) U.S. Cl. ...................... 428/446; 428/457; 428/500; 428/515; 428/522; 525/71

(58) Field of Classification Search ................... 525/71; 428/446, 457, 500, 515, 522
See application file for complete search history.

(56) References Cited

U.S. PATENT DOCUMENTS

| | | | |
|---|---|---|---|
| 3,862,265 A | | 1/1975 | Steinkamp et al. |
| 3,953,655 A | | 4/1976 | Steinkamp et al. |
| 4,001,172 A | | 1/1977 | Steinkamp et al. |
| 4,698,395 A | | 10/1987 | Inoue et al. |
| 4,762,882 A | | 8/1988 | Okano et al. |
| 4,927,888 A | * | 5/1990 | Strait et al. .................. 525/285 |
| 5,369,168 A | * | 11/1994 | Famili et al. .................. 525/57 |

FOREIGN PATENT DOCUMENTS

| | | |
|---|---|---|
| EP | 247 877 | 12/1987 |
| WO | 90/01504 | 2/1990 |

* cited by examiner

*Primary Examiner*—Jeffrey Mullis
(74) *Attorney, Agent, or Firm*—Jarrod N Raphael

(57) ABSTRACT

A graft copolymer mixture comprises
a) from 10 to 50% by weight, based on the mixture, of an ethylene-acrylic acid copolymer and/or an ethylene-acrylic acid-acrylate terpolymer;
b) from 50 to 90% by weight, based on the mixture, of an ethylene-α-olefin copolymer; and
c) ethylenically unsaturated dicarboxylic acids and/or dicarboxylic anhydrides;
the ethylenically unsaturated dicarboxylic acids and/or dicarboxylic anhydrides (c) having been grafted onto (a) and (b).

19 Claims, No Drawings

GRAFT COPOLYMER MIXTURE WITH IMPROVED PROPERTIES AND THE USE THEREOF AS AN ADHESION PROMOTER

The present invention relates to a graft copolymer mixture, to a process for preparing a graft copolymer mixture and to its use as an adhesion promoter in, for example, a multilayer composite.

It is known that with homopolymers and nonpolar copolymers of ethylene it is impossible to achieve sufficient adhesion to metallic surfaces, for example, or else to polar plastics, such as polyamides, EVOH, for instance. In order to ensure sufficient adhesion or to improve the adhesion, it is common to apply thin layers of an adhesion promoter between the substrate surface and the polyethylene.

Other nonpolar plastics, such as polypropylene, fluoropolymers or silicone polymers, for instance, are also frequently difficult to bond.

Common ethylene-based adhesion promoters known in the prior art include polar binary copolymers or terpolymers of ethylene with vinyl acetate, acrylic acid or acrylic esters. The aforementioned substances can be used to achieve improved adhesion to polar plastics or metallic surfaces. Moreover, compounds known as ionomers, i.e., thermoplastic copolymers of ethylene with carboxyl-containing monomers, are also suitable as adhesion promoters for the aforementioned purpose. Finally, polyethylene grafted with dicarboxylic acids or their anhydrides may also act as adhesion promoters.

The preparation of such grafted polyethylenes and their use as adhesion promoters are known. The U.S. Pat. No. 4,762,882, for example, describes a modified olefin resin, consisting of a copolymer of ethylene and an α-olefin, onto which an ethylenically unsaturated carboxylic acid or derivative thereof has been grafted. This graft copolymer is suitable, for example, as an adhesion promoter for EVOH and can be used if desired as an adhesive when it is admixed with a further unmodified or ungrafted polymer or copolymer. A disadvantage, however, is that the adhesion promoters described in U.S. Pat. No. 4,762,882 are difficult to process. A further disadvantage of the above-described graft copolymers lies in the fact that the polymeric material exhibits brittle behavior at low temperatures and is liable to fracture. The brittleness of the material also has the effect that the polymer mixtures of U.S. Pat. No. 4,762,882 do not exhibit the desired cohesive (elastic) fracture pattern in the peel test.

EP 0 247 877 also describes a graft copolymer as adhesion promoter. The monomer used for grafting on is fumaric acid. Polymers suitable for grafting on are copolymers of ethylene with butyl acrylate, ethyl acrylate, methyl acrylate or vinyl acetate. However, the adhesion promoters based on these polar copolymers tend during application to stick to the contact roll and are therefore difficult to process. A further disadvantage of the adhesion promoters and graft copolymers of EP 0 247 877 is that sufficient adhesion between the substrate and the material to be bonded is ensured only within a limited temperature range (below 60° C.).

The remarks above indicate that the prior art adhesion promoters based on graft copolymers have a number of serious disadvantages. There is therefore a pressing need to provide a graft copolymer mixture which is suitable as an adhesion promoter but which does not have the aforementioned disadvantages of the prior art.

Moreover, it would be desirable to provide a graft copolymer mixture containing very little graft monomer, since such monomers are frequently toxic—as in the case of maleic anhydride, for example—and consequently on grounds of occupational hygiene it should be ensured that there is quantitative conversion or graft yield. Further desirable properties are a very high bond strength over a very wide temperature range from −40° C. to +80° C., cohesive fracture, i.e., separation of the adhesion promoter or adhesive within itself (in the peel test), ease of processing with minimal neck-in, high resistance to the formation of stress cracks, and an absence of sticking to the contact roll during processing. It is an object of the present invention to provide an adhesion promoter based on a graft copolymer mixture which has the advantageous properties mentioned while avoiding the known disadvantages.

Further objects will emerge from the following description of the invention.

We have found that this object is achieved by a graft copolymer mixture comprising a) from 10 to 50% by weight, based on the mixture, of an ethylene-acrylic acid copolymer and/or an ethylene-acrylic acid-acrylate terpolymer;

b) from 50 to 90% by weight, based on the mixture, of an ethylene-α-olefin copolymer; and c) ethylenically unsaturated dicarboxylic acids and/or dicarboxylic anhydrides;

the ethylenically unsaturated dicarboxylic acids and/or dicarboxylic anhydrides c) having been grafted onto a) and b).

Advantageous embodiments of the graft copolymer mixture of the invention are defined in the subclaims.

Copolymers of ethylene with α-olefins that are particularly suitable in accordance with the invention are medium density polyethylenes (PE-MD) or low density polyethylenes (PE-LLD), which are preparable by known methods using Ziegler, Phillips or metallocene catalysts. In one particularly suitable embodiment, the α-olefins used in the ethylene-α-olefin copolymer are 1-butene, 1-hexene and/or 1-octene. The ethylene-α-olefin copolymers used with preference in accordance with the present invention have a density of from $0.920 \text{ g/cm}^3$ to $0.945 \text{ g/cm}^3$, preferably from $0.930 \text{ g/cm}^3$ to $0.940 \text{ g/cm}^3$, and with particular preference about $0.935 \text{ g/cm}^3$, and a melt flow index MFI (190/2.16) of from 0.1 to 10 g/10 min, preferably from 0.2 to 6 g/10 min, and with particular preference from 0.2 to 4 g/10 min. The abovementioned values for the density of the copolymer of the invention are determined in accordance with ISO 1183, the values for the melt index MFI in accordance with ISO 1133.

Component a) is preferably an ethylene-acrylic acid copolymer or an ethylene-acrylic acid-acrylate terpolymer or else a mixture of the aforementioned copolymers and terpolymers. These acrylic acid polyethylenes are preparable by free-radical polymerization by the high pressure process. In an embodiment which is particularly preferred in accordance with the invention, the amount of acrylic acid in the graft copolymer mixture is from 0.1 to 5% by weight, with particular preference from 1 to 3% by weight, based on components a) and b). In accordance with the invention it is additionally preferred for the amount of acrylic acid in the ethylene-acrylic acid copolymer and/or ethylene-acrylic acid-acrylate terpolymer used to be from 1 to 10% by weight, preferably from 3 to 6% by weight, and with particular preference about 4% by weight, based on the polymer, and/or for the amount of acrylate in the ethylene-acrylic acid-acrylate terpolymer to be from 1 to 15% by weight, preferably from 5 to 10% by weight, and with particular preference about 8% by weight, based on the terpolymer.

In accordance with the present invention it is also particularly preferred for the amount of ethylenically unsaturated dicarboxylic acids and/or dicarboxylic anhydrides to be from 0.01 to 0.5% by weight, preferably from 0.05 to 0.15% by weight, and with particular preference about 0.1% by weight, based on components a) and b). The low concentrations of graft monomers that are preferred in accordance with the invention are not only advantageous on occupational hygiene grounds, in view of the toxicity, but are also of economic benefit. It can generally be assumed when using low concentrations of graft monomers, for example, <0.25% by weight based on the base polymer, that the graft yield will be virtually quantitative. Ethylenically unsaturated dicarboxylic acids and anhydrides that are particularly suitable in the context of the present invention include maleic acid, fumaric acid, itaconic acid, maleic anhydride and itaconic anhydride. In one particularly preferred embodiment, maleic anhydride (MSA) is used as component c), i.e., as graft monomer.

The present specification further provides a process for preparing a graft copolymer mixture comprising components a), b) and c), in which the ethylenically unsaturated dicarboxylic acids and/or dicarboxylic anhydrides c) have been grafted onto a) and b), which comprises preparing the graft copolymer mixture comprising the ethylene-acrylic acid copolymer and/or ethylene-acrylic acid-acrylate terpolymer, the ethylene-α-olefin copolymer and the ethylenically unsaturated dicarboxylic acids and/or dicarboxylic anhydrides in one step. The expression "in one step" means in the context of the present invention that the mixing of components a), b) and c) and the graft copolymerization take place in a single process step ("one-pot reaction").

Extruders and extrusion techniques suitable for the process of the invention are described, for example, in U.S. Pat. No. 3,862,265, U.S. Pat. No. 3,953,655 and U.S. Pat. No. 4,001,172. Particularly suitable for the process of the invention are continuous kneading apparatus, with particular preference being given to twin-screw extruders. The process of the invention for preparing the graft copolymer mixture is preferably conducted in a temperature range from 210° C. to 300° C. and at pressures of from 1 to 500 bar. The graft copolymer is preferably prepared in the absence of an initiator which undergoes free-radical breakdown. However, it is also possible for small amounts, for example, from 0.01 to 0.1% by weight, based on the polymer mixture, of an organic peroxide to be present during the grafting reaction.

In accordance with the present invention, the grafting of the unsaturated carboxylic acids and/or their anhydrides may take place by melting the polymeric component a) and the polymeric component b) and also the monomer c) which is to be grafted, intimately mixing the melts, and then carrying out reaction at elevated temperature, preferably at from 210 to 300° C., with particular preference at from 220 to 280° C., and with very particular preference at from 240 to 280° C., to give the graft copolymer mixture of the invention. The sequence in which the components are added to the reactor or extruder is not critical.

Despite the very low graft monomer fraction, the graft copolymer mixtures of the present invention surprisingly exhibit excellent bond strengths and peel strengths. Particularly high peel strengths are observed in a 3-layer assembly with epoxy resin and medium-density polyethylene or else high density polyethylene as cladding materials. The high peel strength can also be found at high temperatures (80° C.), i.e., there is no significant decrease observed in the bond strength at high temperatures. The excellent bond strengths in a 3-layer assembly with numerous materials, which are observed despite the extremely low fraction of graft monomers, lead the inventors back to a possible synergistic effect between the graft monomer and the acrylic acid-containing polyethylene component a).

Moreover, the graft copolymer mixtures of the present invention are notable for low moisture absorption and excellent processing properties. The ease of processing of the graft copolymers of the invention is manifested, inter alia, in a low level of neck-in. In the peel test, moreover, the graft copolymer mixtures of the invention exhibit the desired cohesive (elastic) fracture pattern, which is a particularly important property or requirement in connection with the coating of pipes, in particular.

The present invention additionally provides for the use of the graft copolymer mixture as an adhesion promoter, preferably as an adhesion promoter for metal pipe coatings, and with particular preference as an adhesion promoter for steel pipe coatings. The present invention further provides a multilayer assembly which comprises at least one layer of the graft copolymer mixture of the invention and also one or more layers selected from metal, plastic, especially polar plastic materials, glass, ceramic and other polymer materials.

Examples 1–3 below illustrate further advantages of the adhesion promoters of the invention. It should be noted that the examples below serve to illustrate the invention and are not to be understood as a limitation on it.

EXAMPLE 1

70 parts by weight of a copolymer of ethylene with 1-hexene having a density of 0.936 g/cm$^3$ and a melt index MFI (190/2.16) of 3.0 g/10 min were melted together with 30 parts by weight of an ethylene-acrylic acid-n-butyl acrylate terpolymer having an acrylic acid content of 4% by weight and an n-butyl acrylate content of 8% by weight in a twin-screw extruder ZSK 57 from Werner and Pfleiderer with the addition of 0.08% by weight of maleic anhydride which had been grafted onto the polyolefin mixture at 220° C.

The average residence time of the graft components in the extruder was 2 min and the polymer throughput was 50 kg/h at 150 rpm.

COMPARATIVE EXAMPLE 1

70 parts by weight of a copolymer of ethylene with 1-hexene having a density of 0.936 g/cm$^3$ and a melt index MFI (190/2.16) of 3.0 g/10 min were melted together with 30 parts by weight of an ethylene-n-butyl acrylate copolymer having an n-butyl acrylate content of 15% by weight in a twin-screw extruder ZSK 57 from Werner and Pfleiderer with the addition of 0.5% by weight of maleic anhydride which had been grafted onto the polyolefin mixture at 220° C.

COMPARATIVE EXAMPLE 2

100 parts by weight of the copolymer of ethylene with 1-hexene having a density of 0.936 g/cm$^3$ and a melt index MFI (190/2.16) of 3.0 g/10 min from Example 1 were melted with the addition of 0.08% by weight of maleic anhydride which had been grafted onto the polyolefin mixture at 220° C.

COMPARATIVE EXAMPLE 3

100 parts by weight of the ethylene-acrylic acid-n-butyl acrylate terpolymer having an acrylic acid content of 4% by weight and an n-butyl acrylate content of 8% by weight from Example 1 were melted in a twin-screw extruder ZSK 57 from Werner and Pfleiderer with the addition of 0.08% by weight of maleic anhydride which had been grafted onto the polyolefin mixture at 220° C.

The products obtained were pressed to 2.7 mm thick iron/epoxy resin/adhesion promoter/polyethylene composite plates and the peel strengths were determined by a test along the lines of DIN 30 670.

Table 1 below shows the peel strength in the 3-layer composite at different temperatures, using the adhesion promoter of Example 1.

TABLE 1

| Temperature in ° C. | Peel strength in the 3-layer composite*) in N/2 cm |
|---|---|
| 25 | 550 |
| 50 | 540 |
| 70 | 520 |
| 80 | 510 |

*)Steel/basebox/adhesion promoter/Lupolen 3652 D sw 00413

The peel strengths obtained show that the high bond strength of the adhesion promoter of the invention is maintained even as temperatures increase. Even at temperatures above 60° C., values of more than 500 N/2 cm were obtained.

Table 2 below shows the results obtained on investigating the adhesion promoter properties of the inventive Example 1 and of the Comparative Examples 1–3.

TABLE 2

| Adhesion promoter | Example 1 | Comparative Example 1 | Comparative Example 2 | Comparative Example 3 |
|---|---|---|---|---|
| Acrylic acid content of the mixture [% by weight] | 1.2 | — | — | 4 |
| MSA content of the grafted mixture [% by weight] | 0.08 | 0.5 | 0.08 | 0.08 |
| Moisture absorption after 30 d/80° C. [% by weight] | 0.32 | 0.46 | 0.28 | 0.52 |
| Peel strength at 23° C. in the 3-layer composite*) [N/2 cm] | 550 | 450 | 170 | 260 |
| Peel strength at 80° C. in the 3-layer composite*) [N/2 cm] | 510 | 100 | <50 | No adhesion |
| Cohesive fracture at 23° C. | Yes | Yes | No | — (No adhesion) |
| Processing properties | Good | Good | Inadequate | Good |
| Neck-in [%] | 14 | 16 | 60 | 12 |

*)Steel/basebox/adhesion promoter/Lupolen 3652 D sw 00413; the reported peel strengths are averages from 5 measurements Table 2 indicates without any doubt that the adhesion promoter of the invention (Example 1) not only has a relatively low moisture absorption but also has a peel strength which is markedly higher, especially at 80° C., than that of the prior art adhesion promoters. Moreover, the desired cohesive (elastic) fracture is found in the peel test, and outstanding processing properties are observed.

We claim:
1. A graft copolymer mixture comprising
   a) from 10 to 50% by weight, based on the mixture, of an ethylene-acrylic acid copolymer, ethylene-acrylic acid-acrylate terpolymer, or combinations thereof;
   b) from 50 to 90% by weight, based on the mixture, of an ethylene-α-olefin copolymer; and
   c) an ethylenically unsaturated dicarboxylic acid, dicarboxylic anhydride, or combinations thereof;
   the ethylenically unsaturated dicarboxylic acid, dicarboxylic anhydrides, or combinations thereof being grafted onto a) and b).

2. The graft copolymer mixture as claimed in claim 1, wherein the ethylene-acrylic acid copolymer, ethylene-acrylic acid-acrylate terpolymer, or combinations thereof comprise acrylic acid from 0.1 to 5% by weight based on components a) and b).

3. The graft copolymer mixture as claimed in claim 1, wherein the ethylene-acrylic acid copolymer, ethylene-acrylic acid-acrylate terpolymer, or combinations thereof comprise acrylic acid from 1 to 3% by weight based on components a) and b).

4. The graft copolymer mixture as claimed in claim 1, wherein the ethylenically unsaturated dicarboxylic acid, dicarboxylic anhydride, or combinations thereof is present from 0.01 to 0.5% by weight based on components a) and b).

5. The graft copolymer mixture as claimed in claim 1, wherein the ethylenically unsaturated dicarboxylic acid, dicarboxylic anhydride, or combinations thereof is present from 0.05 to 0.15% by weight based on components a) and b).

6. The graft copolymer mixture as claimed in claim 1, wherein the ethylenically unsaturated dicarboxylic acid, dicarboxylic anhydride, or combinations thereof is present in about 0.1% by weight based on components a) and b).

7. The graft copolymer mixture as claimed in claim 1, wherein the ethylenically unsaturated dicarboxylic anhydride is maleic anhydride.

8. The graft copolymer mixture as claimed in claim 1, wherein the ethylene-α-olefin copolymer comprises a density of from 0.920 $g/cm^3$ to 0.945 $g/cm^3$ and a melt flow index (190/2.16) of from 0.1 to 10 g/10 min.

9. The graft copolymer mixture as claimed in claim 1, wherein the ethylene-α-olefin copolymer comprises a density of from 0.930 $g/cm^3$ to 0.940 $g/cm^3$ and a melt flow index (190/2.16) of from 0.2 to 6 g/10 min.

10. The graft copolymer mixture as claimed in claim 1, wherein the ethylene-α-olefin copolymer comprises a density of about 0.935 $g/cm^3$ and a melt flow index (190/2.16) of from 0.2 to 4 g/10 min.

11. The graft copolymer mixture as claimed in claim 1, wherein the ethylene-acrylic acid copolymer, ethylene-acrylic acid-acrylate terpolymer, or combination thereof comprises acrylic acid from 1 to 10% by weight based on the graft copolymer mixture.

12. The graft copolymer mixture as claimed in claim 1, wherein the ethylene-acrylic acid copolymer, ethylene-acrylic acid-acrylate terpolymer, or combination thereof comprises acrylic acid from preferably from 3 to 6% by weight based on the graft copolymer mixture.

13. The graft copolymer mixture as claimed in claim 1, wherein the ethylene-acrylic acid copolymer, ethylene-acrylic acid-acrylate terpolymer, or combination thereof comprises acrylic acid is about 4% by weight based on the graft copolymer mixture.

14. The graft copolymer mixture as claimed in claim 1, wherein the amount of acrylate in the ethylene-acrylic acid-acrylate terpolymer is from 1 to 15% by weight based on the terpolymer.

15. The graft copolymer mixture as claimed in claim 1, wherein the amount of acrylate in the ethylene-acrylic acid-acrylate terpolymer is from 5 to 10% by weight based on the terpolymer.

16. The graft copolymer mixture as claimed in claim 1, wherein the amount of acrylate in the ethylene-acrylic acid-acrylate terpolymer is about 8% by weight based on the terpolymer.

17. The graft copolymer mixture as claimed in claim 1, wherein the ethylene-α-olefin copolymer comprises 1-butene, 1-hexene, 1-octene, or combinations thereof.

18. A process for preparing a graft copolymer mixture comprising:
   a) from 10 to 50% by weight, based on the mixture, of an ethylene-acrylic acid copolymer, ethylene-acrylic acid-acrylate terpolymer, or combinations thereof;
   b) from 50 to 90% by weight, based on the mixture, of an ethylene-α-olefin copolymer; and
   c) an ethylenically unsaturated dicarboxylic acid, dicarboxylic anhydride, or combinations thereof;

the ethylenically unsaturated dicarboxylic acid, dicarboxylic anhydrides, or combinations thereof being grafted onto a) and b), wherein the process comprises mixing in one step (i) the ethylene-acrylic acid copolymer, ethylene-acrylic acid-acrylate terpolymer, or combinations thereof, (ii) the ethylene-α-olefin copolymer, and (iii) the ethylenically unsaturated dicarboxylic acid, dicarboxylic anhydride, or combinations thereof.

19. A multilayer composite comprising at least one layer of a graft copolymer mixture comprising
   a) from 10 to 50% by weight, based on the mixture, of an ethylene-acrylic acid copolymer, ethylene-acrylic acid-acrylate terpolymer, or combinations thereof;
   b) from 50 to 90% by weight, based on the mixture, of an ethylene-α-olefin copolymer; and
   c) an ethylenically unsaturated dicarboxylic acid, dicarboxylic anhydride, or combinations thereof;

the ethylenically unsaturated dicarboxylic acid, dicarboxylic anhydrides, or combinations thereof being grafted onto a) and b); and one or more layers of the multilayer composite are selected from metal, plastic, glass, ceramic, at least one polymer material, and combinations thereof.

* * * * *